United States Patent
Watanabe et al.

(10) Patent No.: US 10,903,772 B2
(45) Date of Patent: Jan. 26, 2021

(54) MULTIGROUP-MULTIPHASE ROTATING-ELECTRIC-MACHINE DRIVING APPARATUS

(71) Applicant: Mitsubishi Electric Corporation, Tokyo (JP)

(72) Inventors: Masutaka Watanabe, Tokyo (JP); Keiichi Enoki, Tokyo (JP); Yoshimasa Nishijima, Tokyo (JP); Shingo Harada, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 16/474,633

(22) PCT Filed: May 17, 2017

(86) PCT No.: PCT/JP2017/018511
§ 371 (c)(1),
(2) Date: Jun. 28, 2019

(87) PCT Pub. No.: WO2018/211620
PCT Pub. Date: Nov. 22, 2018

(65) Prior Publication Data
US 2020/0067443 A1  Feb. 27, 2020

(51) Int. Cl.
 *H02P 1/00* (2006.01)
 *H02P 25/22* (2006.01)
 *H02P 29/024* (2016.01)
 *H02P 27/06* (2006.01)

(52) U.S. Cl.
 CPC .............. *H02P 25/22* (2013.01); *H02P 27/06* (2013.01); *H02P 29/0241* (2016.02)

(58) Field of Classification Search
 CPC ........ H02P 29/0241; H02P 27/06; H02P 3/22; H02P 5/74; H02P 6/28
 See application file for complete search history.

(56) References Cited

U.S. PATENT DOCUMENTS

2018/0006593 A1    1/2018  Watanabe et al.
2018/0337624 A1*  11/2018  Moritake .................. H02P 3/22

FOREIGN PATENT DOCUMENTS

| JP | 2004-249534 A | 9/2004 |
| JP | 4675299 B2 | 4/2011 |
| JP | 2012205492 A | 10/2012 |
| JP | 2016059085 A | 4/2016 |
| WO | 2016/181448 A1 | 11/2016 |

OTHER PUBLICATIONS

International Search Report of PCT/JP2017/018511 dated Aug. 15, 2017.
Communication dated Jun. 23, 2020, from the Japanese Patent Office in Application No. 2019-518662.

* cited by examiner

*Primary Examiner* — Karen Masih
(74) *Attorney, Agent, or Firm* — Sughrue Mion, PLLC; Richard C. Turner

(57) ABSTRACT

When the connection between a DC power source and a multigroup-multiphase electric-power conversion apparatus is cut off, a control apparatus controls switching devices so that the respective states of the two or more groups of electric-power conversion apparatuses included in the multigroup-multiphase electric-power conversion apparatus are each switched stepwise from all-phase short-circuiting state to an all-phase cutoff state at different timings.

12 Claims, 10 Drawing Sheets

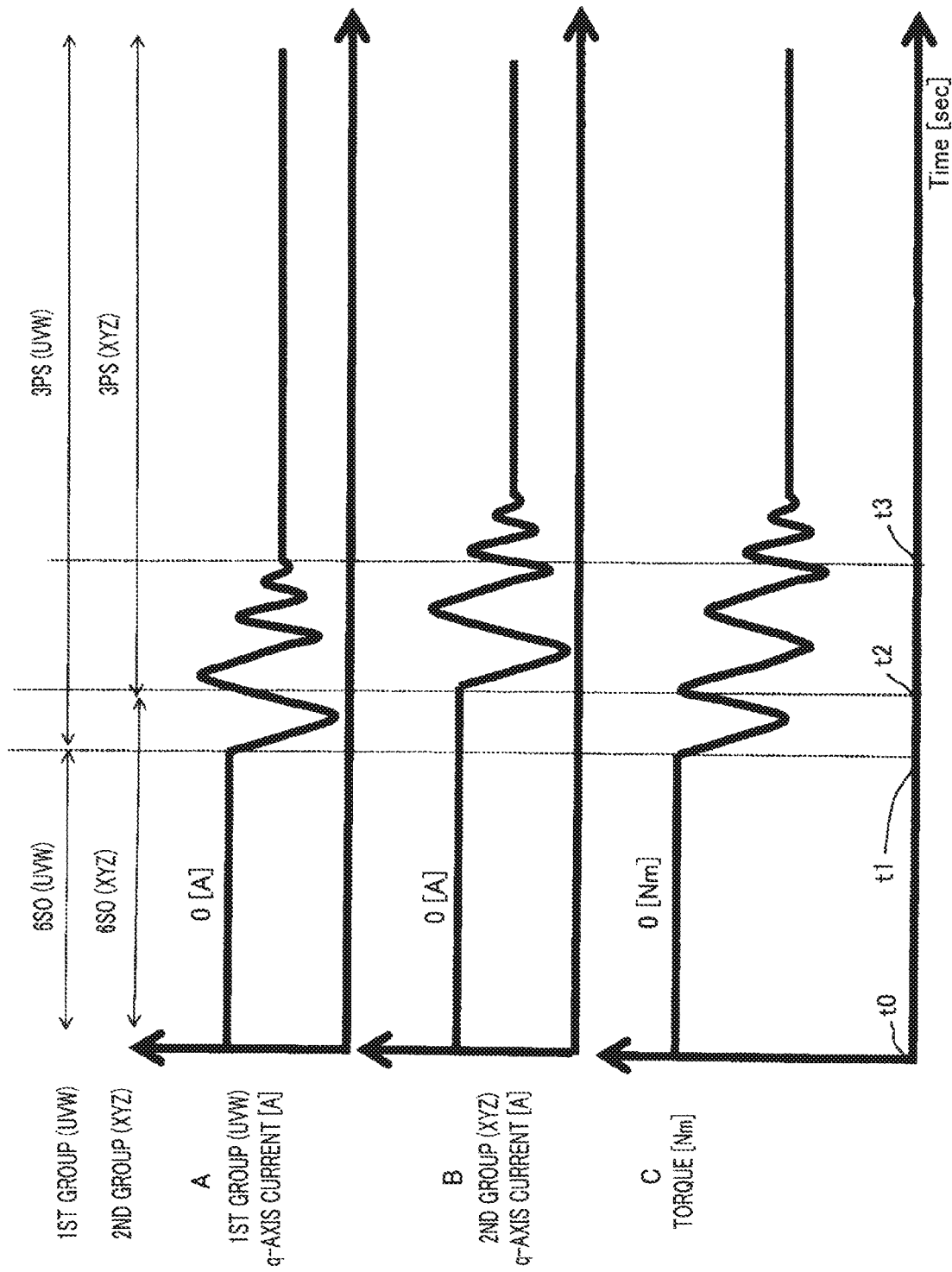

MULTIGROUP-MULTIPHASE ROTATING-ELECTRIC-MACHINE DRIVING APPARATUS

CROSS REFERENCE TO RELATED APPLICATIONS

This application is a National Stage of International Application No. PCT/JP2017/018511 filed May 17, 2017.

TECHNICAL FIELD

The present invention relates to a rotating-electric-machine driving apparatus to be mounted in a vehicle or the like and more particularly to a multigroup-multiphase rotating-electric-machine driving apparatus having independent multigroup-multiphase armature windings in a stator and magnetic-field poles formed of permanent magnets in a rotor.

BACKGROUND ART

In recent years, as a vehicle in which energy saving and environment are considered, a hybrid vehicle and an electric automobile have been drawing attention. A hybrid vehicle has an electric motor, as a driving power source, in addition to a conventional engine. An electric automobile has only an electric motor, as a driving power source. Each of a hybrid vehicle and an electric automobile makes an inverter convert DC electric power stored in a battery into AC electric power so as to drive an electric motor, and travels with the electric motor as a driving power source.

In general, in a hybrid vehicle, a motor generator having an electric power generation function is utilized as a driving power source for making the vehicle travel. A rotating electric machine configured as the motor generator generates electric power by use of rotation energy produced when the engine is driven, and performs regenerative power generation by use of rotation energy transferred from wheels when the vehicle is inertially traveling. The AC electric power generated by the rotating electric machine is converted into DC electric power by an inverter and then is stored in a battery.

In the conventional rotating-electric-machine driving apparatus, configured in such a manner as described above, in the case where while the rotating electric machine generates electric power, there occurs the phenomenon, for example, that a connecter provided in a control apparatus is disconnected from a power-source conductor connected with the battery or that a circuit breaker or the like inserted between the connecter and the power-source conductor is opened, energy that has been supplied from the rotating electric machine to the battery is supplied to a DC charging portion of the inverter in the control apparatus and hence a rapid voltage hike may occur in the DC charging portion of the inverter. Such a rapid voltage hike in the DC charging portion of the inverter may cause a trouble such as deterioration or breakage of a circuit element included in the inverter or the control apparatus including the inverter.

In order to suppress the foregoing trouble from being caused, in a conventional rotating-electric-machine driving apparatus, for example, disclosed in Patent Document 1, an overvoltage determination means for determining an overvoltage in the output circuit of the rotating electric machine is provided; in the case where the overvoltage determination means determines that an overvoltage has occurred in the output circuit of the rotating electric machine, an electric-power conversion apparatus including an inverter is controlled in such a way that a phase short circuit is caused in the rotating electric machine, so that an hike in the power-source voltage is reduced and the power-source voltage is quickly decreased. As a result, it is made possible that circuit elements utilized in the control apparatus or apparatuses are protected from being broken or deteriorated by a voltage.

PRIOR ART REFERENCE

Patent Document

[Patent Document 1] Japanese Patent Publication; No. 4675299

DISCLOSURE OF THE INVENTION

Problems to be Solved by the Invention

In the conventional rotating-electric-machine driving apparatus disclosed in foregoing Patent Document 1, because each time the connection between the control apparatus and the battery is cut off, three-phase short-circuiting is applied to the rotating electric machine, a short-circuit current flowing in the rotating electric machine produces braking torque in the rotating electric machine and hence kinetic energy of the vehicle is decreased. When the rotating electric machine comes to be in the three-phase short-circuiting state, it is not made possible that the other vehicle apparatuses are supplied with electric power by use of an induction voltage in the rotating electric machine. Accordingly, it is required to switch the state of the rotating electric machine from the three-phase short-circuiting state to the all-phase cutoff state.

However, because when the rotating electric machine comes to be in the all-phase cutoff state, the current that has been flowing in the rotating electric machine at a time of the three-phase short-circuiting state is steeply cut off, magnetic energy in the motor coil causes a sudden rise in the power-source voltage. The sudden rise in the power-source voltage may cause a trouble; for example, circuit elements utilized in the control apparatus or loads of the rotating electric machine may be deteriorated or broken by an overvoltage.

Additionally, in the case where when driven by the engine, the rotation speed of the rotating electric machine rises, the induction voltage in the rotating electric machine rises and hence the power-source voltage for the inverter becomes an overvoltage, it is required to switch the state of the rotating electric machine from the all-phase cutoff state to the three-phase short-circuiting state. However, because when the rotating electric machine comes to be in the three-phase short-circuiting state, the braking torque produced in the rotating electric machine transiently becomes large and then stabilizes at a constant value, the braking torque of the rotating electric machine largely fluctuates, thereby deteriorating the behavior of the vehicle and the drivability and causing the engine rotation speed to fluctuate; thus, in the worst case, the engine may stop.

The present invention has been implemented in order to solve the foregoing problems in conventional rotating-electric-machine driving apparatuses; the objective thereof is to provide a rotating-electric-machine driving apparatus that makes it possible that even when the connection between the rotating-electric-machine driving apparatus and the battery is cut off, an overvoltage that occurs when the all-phase short-circuiting (e.g., three-phase short-circuiting) is switched into the all-phase cutoff is suppressed and that makes it possible that fluctuation in the braking torque at a time when the all phase cutoff is switched into the all-phase short-circuiting (e.g., three-phase short-circuiting) is reduced.

Means for Solving the Problems

A multigroup-multiphase rotating-electric-machine driving apparatus according to the present invention drives a multigroup-multiphase rotating electric machine having independent must-group-multiphase armature windings and magnetic-field poles formed of permanent magnets; the multigroup-multiphase rotating-electric-machine driving apparatus includes a multigroup-multiphase electric-power conversion apparatus provided with two or more groups of electric-power conversion apparatuses that are provided corresponding to the multigroup-multiphase armature windings and each of which performs electric-power conversion between the multiphase armature winding of the corresponding group and a DC power source, a smoothing capacitor connected with the DC side of the multigroup-multiphase electric-power conversion apparatus, and a control apparatus configured in such a way as to be able to separately control the two or more groups of electric-power conversion apparatuses; the multi-group-multiphase rotating-electric-machine driving apparatus is characterized in that each of the two or more groups of electric-power conversion apparatuses includes two or more switching devices to be controlled by the control apparatus and in that when the connection between the DC power source and the multigroup-multiphase electric-power conversion apparatus is cut off, the control apparatus controls the switching devices so that the respective states of the two or more groups of electric-power conversion apparatuses are each switched stepwise from a phase short-circuiting state to an all-phase cutoff state at different timings.

In the present invention, a multigroup-multiphase rotating electric machine denotes a rotating electric machine provided with multigroup-multiphase armature windings.

Advantage of the Invention

A multigroup-multiphase rotating electric machine according to the present invention makes it possible that even when the connection between the rotating-electric-machine driving apparatus and the battery is cut off, an overvoltage that occurs when the all-phase short-circuiting (e.g., three-phase short-circuiting) is switched into the all-phase cutoff is suppressed so that a motor control apparatus and other vehicle apparatuses are protected from being broken by the overvoltage; moreover, the multigroup-multiphase rotating electric machine makes it possible that fluctuation in the braking torque at a time when the all-phase cutoff is switched into the all-phase short-circuiting (e.g., three-phase short-circuiting) is reduced.

BRIEF DESCRIPTION OF THE DRAWINGS

FIG. 8 is a waveform chart representing the respective waveforms of three-phase currents and the torque of the rotating electric machine, in the rotating-electric-machine driving apparatus according to any one of Embodiments 1 and 2 of the present invention, at a time when under the condition that electric-power transfer between the battery and the inverter cannot be performed, three-phase short-circuiting is applied to the rotating electric machine in the all-phase cutoff state.

BEST MODE FOR CARRYING OUT THE INVENTION

Figure 1:
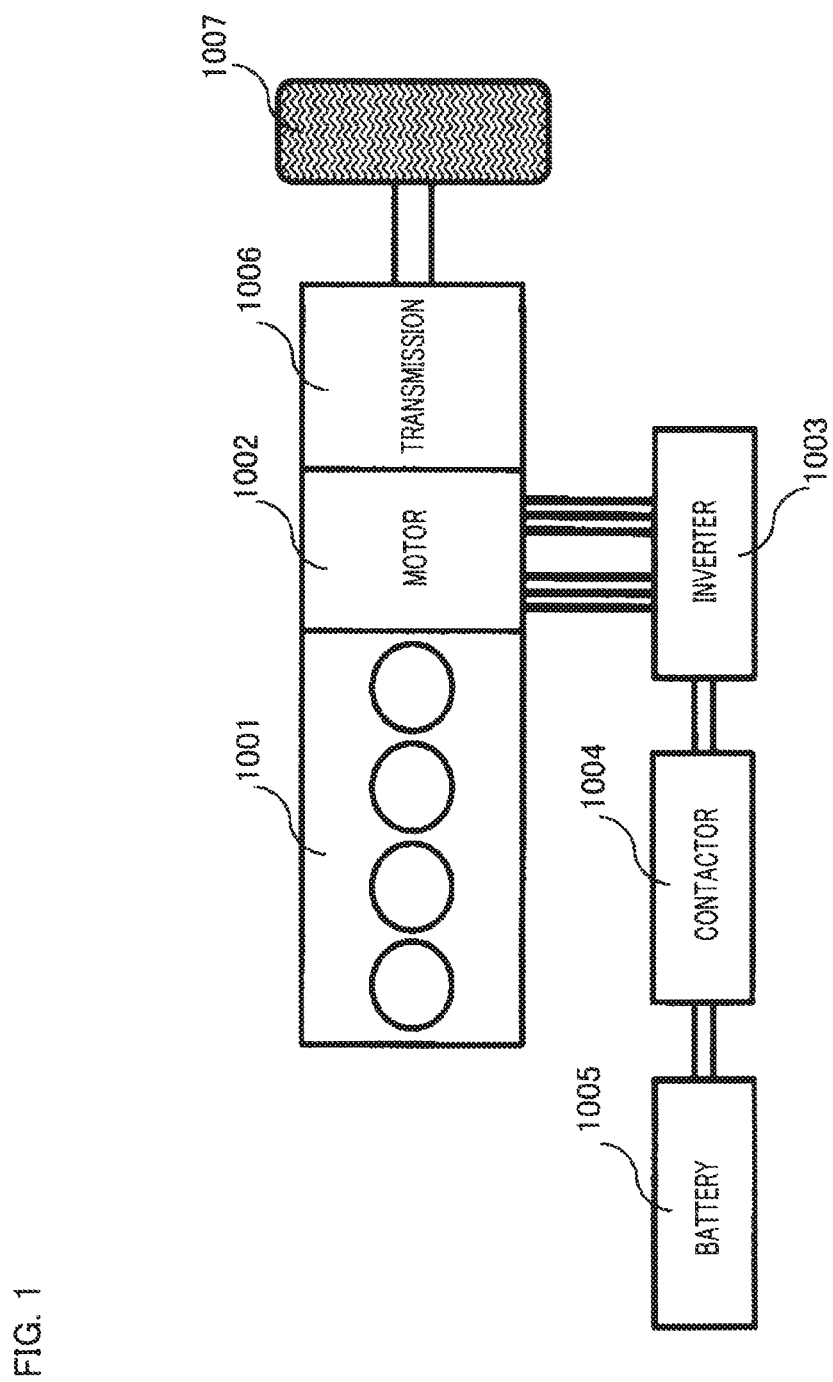
FIG. 1 is a schematic configuration diagram of a vehicle equipped with a rotating-electric-machine driving apparatus according to any one of Embodiments 1 and 2 of the present invention.

Hereinafter, preferred embodiments of a rotating-electric-machine driving apparatus according to the present invention will be explained by use of the drawings. In each of the drawing, the same or equivalent constituent elements are designated by the same reference characters.

Firstly, there will be explained the configuration of a rotating electric machine that is the control subject of a rotating-electric-machine driving apparatus according to any one of Embodiments 1 and 2 of the present invention and the configuration of a vehicle equipped with the rotating electric machine. It is assumed, that the respective configurations of the rotating electric machine and the vehicle, explained in Embodiment 1, are shared by after-mentioned Embodiment 2. FIG. 1 is a schematic configuration diagram of a vehicle equipped with a rotating-electric-machine driving apparatus according to any one of Embodiments 1 and 2 of the present invention; FIG. 1 illustrates a parallel-type hybrid vehicle.

In FIG. 1, an engine 1001 is a driving power source for driving the vehicle. Driving power generated by the engine 1001 is transferred to a transmission 1006 through the intermediary of a rotor axle (unillustrated) on which the rotor of a motor 1002 is fixed, and is further transferred from the transmission 1006 to wheels 1007 of the vehicle so as to rotate the wheels 1007, so that the vehicle is made to travel.

The motor 1002 is a so-called permanent-magnet rotating electric machine that is configured as a motor generator having a power generation function, that has independent two or more groups of armature windings in the stator, and that has magnetic-field poles formed of permanent magnets in the rotor; however, in the following explanation, the permanent-magnet rotating electric machine will be referred to simply as a motor. The motor 1002 is utilized as a driving power source for starting the engine 1001 and for assisting travel of the vehicle. Additionally, when there exists a deceleration demand for the vehicle or a charging demand for a battery 1005, the motor 100 performs regenerative operation so as to charge the battery 1005.

An inverter 1003 as an electric-power conversion apparatus converts DC electric power charged in the battery 1005 into AC electric power so as to drive the motor 1002. Conversely, the inverter 1003 is supplied with regenerative AC electric power by the motor 1002 and converts the regenerative AC electric power into DC electric power so as to charge the battery 1005.

A contactor 1004 is a switch for performing or cutting off electric-power transfer between the inverter 1003 and the battery 1005. The contactor 1004 has a function of cutting off an electric circuit between the battery 1005 and the inverter 1003 so as to protect the battery 1005 when there occurs an abnormality, for example, where an abnormal current flows in the battery 1005.

The battery 1005 performs electric-power transfer between the inverter 1003 and itself and supplies electric power to the other components in the vehicle.

The transmission 1006 transfers driving power with an optimum rotation speed and optimum torque from the engine 1001 and the motor 1002 to the wheels 1007.

In each of after-mentioned embodiments of the present invention, the parallel-type hybrid vehicle illustrated in FIG. 1 will be explained, as an example; however, the present invention can be applied to all types of vehicles that are each equipped with a motor.

Additionally, in each of after-mentioned embodiments of the present invention, there will be explained a type having a single motor, a single inverter, and a single battery; however, it may be allowed that the vehicle has a plurality of rotating electric machines as motor generators, a plurality of inverters, a plurality of batteries and that has, for example, a DC/DC converter for performing voltage conversion between each of the rotating electric machines and each corresponding inverter or between each of the batteries and each corresponding inverter.

In each of after-mentioned embodiments of the present invention, explanation will be made under the assumption that, as described above, the motor 1002 is formed of a permanent-magnet rotating electric machine having a permanent magnet in the rotor; however, it may be allowed that the motor 1002 is a field-magnet motor having no permanent magnet that case, magnetic flux generated in the rotor of the motor is obtained and then a voltage induced in the stator of the motor is obtained, so that there can be demonstrated an effect the same as that of the permanent-magnet rotating electric machine.

In each of after-mentioned embodiments of the present invention, there will be explained the case where the rotating electric machine is a double-three-phase rotating electric machine provided with two groups of three-phase armature windings; however, the present invention is not limited to this case, i.e. it may be allowed that the rotating electric machine is provided with armature windings of three or more phases or provided with two or more groups of armature windings.

Embodiment 1

Figure 2:
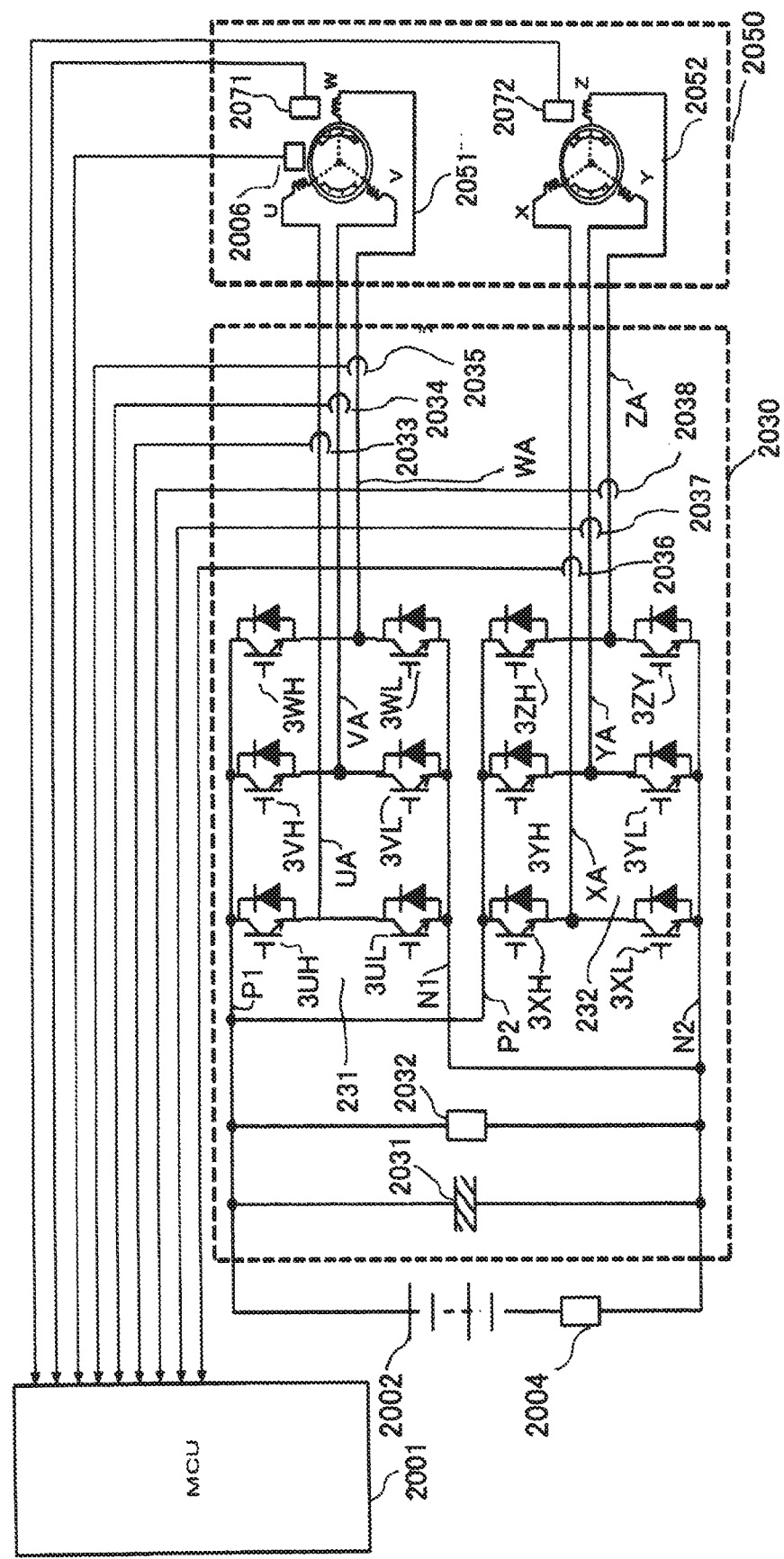
FIG. 2 is schematic configuration diagram of the rotating-electric-machine driving apparatus according to any one of Embodiments 1 and 2 of the present invention.

FIG. 2 is a schematic configuration diagram of a rotating-electric-machine driving apparatus according to any one of Embodiment 1 and after-mentioned Embodiment 2 of the present invention. In FIG. 2, as an example of the rotating-electric-machine driving apparatus according to any one of Embodiments 1 and 2 of the present invention, a motor inverter system having an AC-rotating-electric-machine driving apparatus is represented.

In FIG. 2, a two-group-three-phase motor 2050 corresponds to the moto 1002 in foregoing FIG. 1 and is a so-called permanent-magnet rotating electric machine that is configured as a motor generator having a power generation function, that has independent two groups of armature windings in the stator, and that has magnetic-field poles formed of permanent magnets in the rotor; however, in the following explanation, the permanent-magnet rotating electric machine will be referred to simply as a two-group-three-phase motor.

In its stator, the two-group-three-phase motor 2050 is provided, with a first armature winding group 2051 including three-phase armature windings, i.e., a U-phase winding, a V-phase winding, and a W-phase winding that are connected with one another in a Y-connection manner and a second armature winding group 2052 including three-phase armature windings, i.e., an X-phase winding, a Y-phase winding, and a Z-phase winding that are connected with one another in a Y-connection manner. Each of the first armature winding group 2051 and the second armature winding group 2052 can separately be controlled.

A U-phase current sensor 2033 is coupled with an electric conductor connected with a U-phase winding U of the first armature winding group 2051 and measures the value of an electric current flowing in the U-phase winding U. A V-phase current sensor 2034 is coupled with an electric conductor connected with a V-phase winding V of the first armature winding group 2051 and measures the value of an electric current flowing in the V-phase winding V. A W-phase current sensor 2035 is coupled with an electric conductor connected with a W-phase winding W of the first armature winding group 2051 and measures the value of an electric current flowing in the W-phase winding W.

An X-phase current sensor 2036 is coupled with an electric conductor connected with an X-phase winding X of the second armature winding group 2052 and measures the value of an electric current flowing in the X-phase winding X. A Y-phase current sensor 2037 is coupled with an electric conductor connected with a Y-phase winding Y of the second armature winding group 2052 and measures the value of an electric current flowing in the Y-phase winding Y. A Z-phase current sensor 2038 is coupled with an electric conductor connected with a Z-phase winding Z of the second armature winding group 2052 and measures the value of an electric current flowing in the Z-phase winding Z.

A rotation angle sensor 2006 measures the rotation angle or the rotation speed of the rotor with respect to the first armature winding group 2051. In addition, although not represented in FIG. 2, a rotation angle sensor similar to the rotation angle sensor 2006 may be provided also in the second armature winding group 2052.

A first coil temperature sensor 2071 measures the temperature of the first armature winding group 2051 in the two-group-three-phase motor 2050. Similarly, a second coil temperature sensor 2072 measures the temperature of the second armature winding group 2052 in the two-group-three-phase motor 2050.

A two-group-three-phase inverter 2030, as an electric-power conversion apparatus, corresponds to the inverter 1003 in foregoing FIG. 1 and includes a first three-phase inverter 231 and a second three-phase inverter 232.

The first three-phase inverter 231 includes a U-phase upper arm switching device 3UH, a V-phase upper arm switching device 3VB, a W-phase upper arm switching device 3WH, a U-phase lower arm switching device 3UL, a V-phase lower arm switching device 3V1, and a W-phase lower arm switching device 3WL. Each of these switching devices is formed of a parallel connection member consisting of a circulation diode and a switching device such as an IGBT (Insulated Gate Bipolar Transistor) or an FET (Field Effect Transistor).

In the first three-phase inverter 231, the series connection portion between the emitter terminal of the U-phase upper arm switching device 3UH and the collector terminal of the U-phase lower arm, switching device 3UT, is connected with the U-phase winding U of the first armature winding group 2051, by way of a U-phase conductor UA.

The series connection portion between the emitter terminal of the V-phase upper arm switching device 3VH and the collector terminal of the V-phase lower arm switching device 3VL is connected with the V-phase winding V of the first armature winding group 2051, by way of a V-phase conductor VA.

The series connection portion between the emitter terminal of the W-phase upper arm switching device 3WH and the collector terminal of the W-phase lower arm switching device 3WL is connected with the W-phase winding W of the first armature winding group 2051, by way of a W-phase conductor A.

The U-phase conductor UA, the V-phase conductor VA, and the W-phase conductor WA configure the AC-side terminals of the first three-phase inverter 231.

The respective collector terminals of the U-phase upper arm switching device 3UH, the V-phase upper arm switching device 3VH, and the W-phase upper arm switching device 3WH are connected in parallel with a positive-polarity conductor P1, and are connected with the positive-polarity terminal of the battery 2002 as a DC power source apparatus, byway of the positive-polarity conductor P1. The battery 2002 corresponds to the battery 1005 in foregoing FIG. 1.

The respective emitter terminals of the U-phase lower arm switching device 3UL, the V-phase lower arm switching device 3VL, and the W-phase lower arm switching device 3WL are connected in parallel with a negative-polarity conductor N1, and are connected with the negative-polarity terminal of the battery 2002, by way of the negative-polarity conductor N1.

The positive-polarity conductor P1 and the negative-polarity conductor N1 form the DC-side terminals of the first three-phase inverter 231.

The second three-phase inverter 232 includes an X-phase upper arm switching device 3XH, a Y-phase upper arm switching device 3YH, a Z-phase upper arm switching device 3ZH, an X-phase lower arm switching device 3XL, a Y-phase lower arm switching device 3YL, and a Z-phase lower arm switching device 3ZL. Each of these switching devices is formed of a parallel connection member consisting of a circulation diode and a switching device such as an IGBT (Insulated Gate Bipolar Transistor) or an FET (Field Effect Transistor).

In the second three-phase inverter 232, the series connection portion between the emitter terminal of the X-phase upper arm switching device 3XH and the collector terminal of the X-phase lower arm switching device 3XL is connected with the X-phase winding X of the second armature winding group 2052, by way of an X-phase conductor XA.

The series connection portion between the emitter terminal of the Y-phase upper arm switching device 3YH and the collector terminal of the Y-phase lower arm switching device 3YL is connected with the Y-phase winding Y of the second armature winding group 2052, by way of a Y-phase conductor YA.

The series connection portion between the emitter terminal of the Z-phase upper arm switching device 3ZH and the collector terminal of the Z-phase lower arm switching device 3ZL is connected with the Z-phase winding Z of the second armature winding group 2052, by way of a Z-phase conductor ZA.

The X-phase conductor XA, the Y-phase conductor YA, and the Z-phase conductor ZA configure the AC-side terminals of the second three-phase inverter 232.

The respective collector terminals of the X-phase upper arm switching device 3XH, the Y-phase upper arm switching device 3YH, and the Z-phase upper arm switching device 3ZH are connected in parallel with a second positive-polarity conductor P2, and are connected with the positive-polarity terminal of the battery 2002 as a DC power source apparatus, way of the second positive-polarity conductor P2.

The respective emitter terminals of the X-phase lower arm switching device 3XL, the Y-phase lower arm switching device 3YL, and the Z-phase lower arm switching device 3ZL are connected in parallel with a second negative-polarity conductor N2, and are connected with the negative-polarity terminal of the battery 2002, by way of the second negative-polarity conductor N2.

The positive-polarity conductor P2 and the negative-polarity conductor N2 form the DC-side terminals of the second three-phase inverter 232. The positive-polarity conductor P2 is connected with the foregoing positive-polarity conductor P1 of the first three-phase inverter 231; the negative-polarity conductor N2 is connected with the foregoing negative-polarity conductor N1 of the first three-phase inverter 231.

A smoothing capacitor 2031 connected in parallel with the battery 2002 smooths the DC, voltage of the battery 2002. A voltage sensor 2032 connected in parallel with the battery 2002 measures the DC link voltage of the battery 2002. A current sensor 2004 connected in series with the battery 2002 measures a current flowing in the battery 2002.

A micro control unit (hereinafter, referred to as an MCU) 2001 as a control apparatus is provided with a microprocessor that operates in accordance with predetermined programs, various kinds of memories, and the like.

Based on current values of the respective phases in the first armature winding group 2051, detected by the U-phase current sensor 2033, the V-phase current sensor 2034, and the W-phase current sensor 2035, the MCU 2001 performs PWM (Pulse Width Modulation)—control, through on/off control, of the U-phase upper arm switching device 3UH, the V-phase upper arm switching device 3VH, and the W-phase upper arm switching device 3WH, the U-phase lower arm switching device 3UL, the V-phase lower arm switching device 3VL, and the W-phase lower arm switching device 3WL in the first three-phase inverter 231 so that the values of currents flowing in the respective phases of the first armature winding group 2051 become desired current values.

Additionally, based on current values of the respective phases in the second armature winding group 2052, detected by the X-phase current sensor 2036, the Y-phase current sensor 2037, and the Z-phase current sensor 2038, the MCU 2001 performs PW-control, through on/off control, of the X-phase upper arm switching device 3XH, the Y-phase upper arm switching device 3YH, and the Z-phase upper arm switching device 3ZH, the X-phase lower arm switching device 3XL, the Y-phase lower arm switching device 3YL, and the Z-phase lower arm switching device 3ZL in the second three-phase inverter 232 so that the values of currents flowing in the respective phases of the second armature winding group 2052 become desired current values.

Based on electric currents flowing in the first armature winding group 2051 and the second armature winding group 2052, the two-group-three-phase motor 2050 generates desired torque.

The two-group-three-phase inverter 2030, as an electric-power conversion apparatus, performs on/off control of each of the switching devices in the first three-phase inverter 231 and each of the switching devices in the second three-phase inverter 232, so as to convert DC electric power obtained from the battery 2002 into AC electric power to be supplied to the two-group-three-phase motor 2050 or so as to convert AC electric power obtained from the two-group-three-phase motor 2050 into DC electric power to be supplied to the battery 2002.

The action of turning off all of the switching devices in the first three-phase inverter 231 and the second three-phase inverter 232 will be referred to as action of performing all-phase cutoff (6SO: 6 Switch Open); in the following explanation, this action will be described simply as all-phase cutoff (6SO).

The first three-phase inverter 231 and the second three-phase inverter 232 can perform all-phase cutoff (6SO) at the same time or separately.

The action of turning on all of the upper-arm switching devices or the lower-arm switching devices of the respective phases in the first three-phase inverter 231 or all of the upper-arm switching devices or the lower-arm switching devices of the respective phases in the second three-phase inverter 232 will be referred to as action of performing three-phase short-circuiting (3PS: 3 Phase Short); in the following explanation, this action will be described simply as three-phase short-circuiting (3PS).

The same effect can be obtained when all of the upper-arm switching devices of the respective phases and all of the lower-arm switching devices of the respective phases in the first three-phase inverter 231 or the second three-phase inverter 232 are turned on.

The first three-phase inverter 231 and the second three-phase inverter 232 can perform three-phase short-circuiting (3PS) at the same time or separately.

Figure 3A:
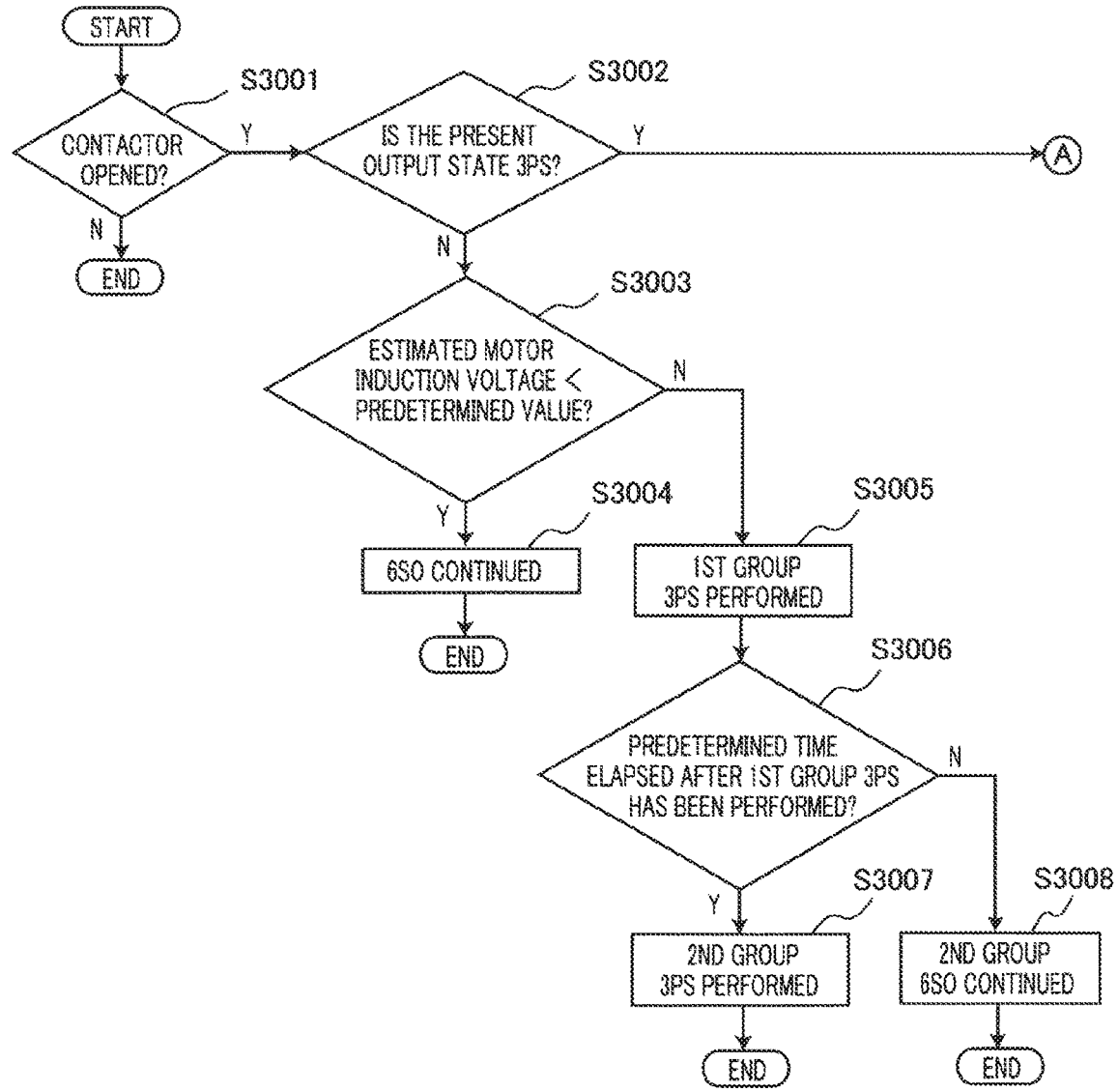
FIG. 3A and FIG. 3B are flowcharts representing the operation of the rotating-electric-machine driving apparatus according to Embodiment 1 of the present invention.
Figure 3B:
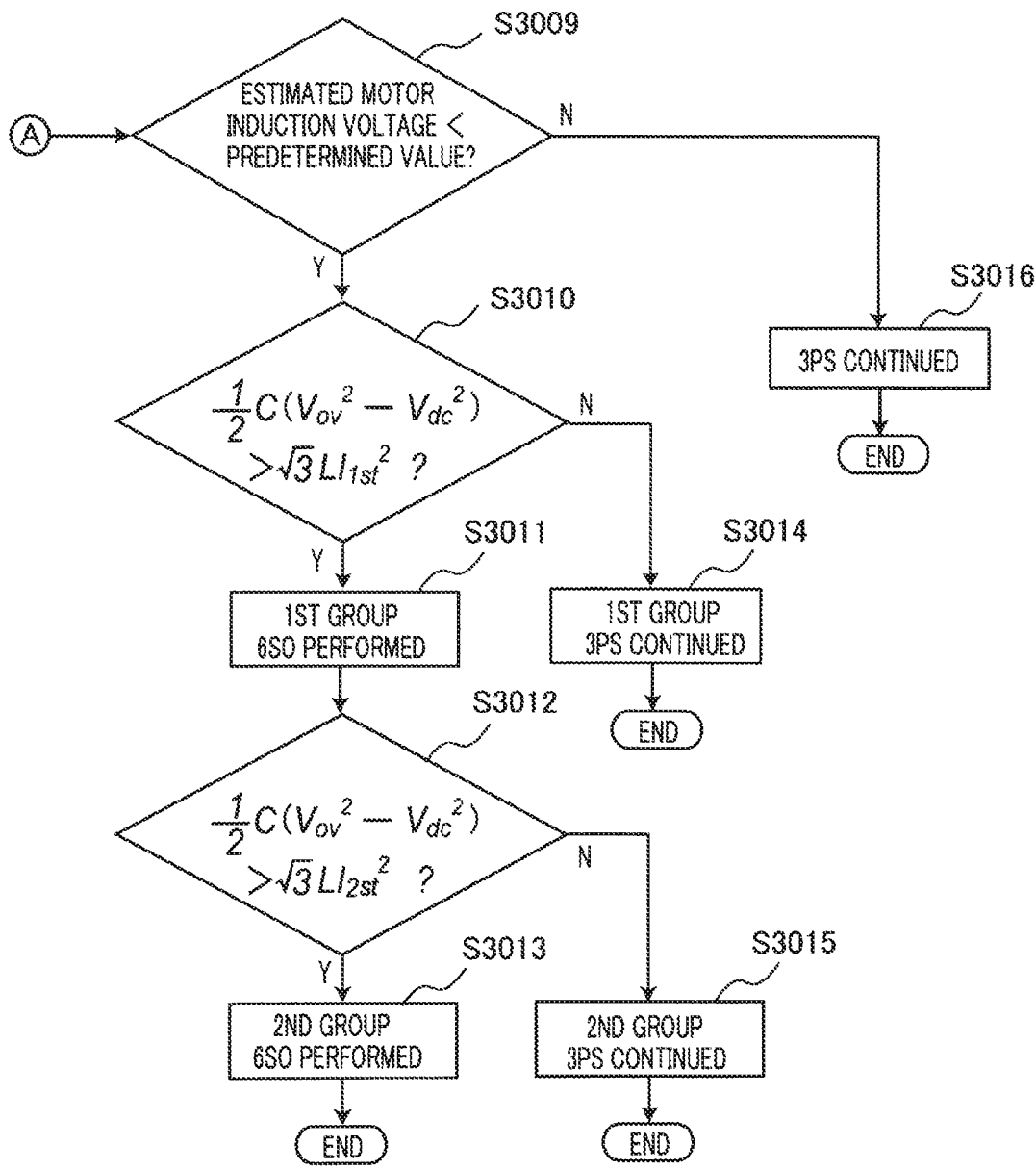

FIG. 3A and FIG. 3B are flowcharts representing the operation of the rotating-electric-machine driving apparatus according to Embodiment 1 of the present invention and represents processing in which three-phase short-circuiting and all-phase cutoff are performed. Hereinafter, by use of FIG. 3A and FIG. 3B, there will be explained the respective details of overvoltage suppression processing at a time of transitional from all-phase cutoff to three-phase short-circuiting and torque fluctuation suppression processing at a time of transition from three-phase short-circuiting to all-phase cutoff. The processing represented by the flowchart in FIG. 3A and FIG. 3B is performed through software processing in MCU 2001.

In FIG. 3A and FIG. 3B, at first in the step S3001, MCU 2001 determines whether or not the contactor 1004 is opened; in the case where MCU 2001 determines that the contactor 1004 is opened (Y), the step S3001 is followed by the step S3002; in the case where MCU 2001 determines that the contactor 1004 is closed (N), it is determined that it is not required to make this logic operate, and then the processing in the flow is ended.

In the step S3002, MCU 2001 determines whether the output of the two-group-three-phase inverter 2030 is in the three-phase short-circuiting (3PS) state or n the all-phase cutoff (6SO) state.

In the case where in the step S3002, the present output of the two-group-three-phase inverter 2030 is not in the three-phase short-circuiting state (N), i.e., the output the two-group-three-phase inverter 2030 is in the all-phase cutoff (6SO) state, the step S3002 is followed by the step S3003; in the case where the present output of the two-group-three-phase inverter 2030 is in the three-phase short-circuiting (3PS) state (Y), the step S3002 is followed by the step S3009.

In the step S3003, MCU 2001 determines whether or not an estimated motor induction voltage of the two-group-three-phase motor 2050 is lower than a predetermined value. Because when the output of the two-group-three-phase inverter 2030 is not in the three-phase short-circuiting (3PS) state but in the all-phase cutoff (6SO) state, the smoothing capacitor 2031 in the two-group-three-phase inverter 2030 is charged with the motor induction voltage, this determination is performed in order to prevent the motor induction voltage from becoming the same as or higher than the breakdown voltage in the two-group-three-phase inverter 2030.

In this situation, the estimated motor induction voltage is obtained through calculation, based on the motor rotation speed and preliminarily measured magnetic flux of the permanent magnets configuring the magnetic-field poles. In that case, it may be allowed that the temperature of the permanent magnet is estimated and then the magnetic flux is changed in accordance with the estimated magnet temperature.

In the case where in the step S3003, it is determined that the estimated motor induction voltage is lower than the predetermined value (Y), the step S3003 is followed by the step S3004; in the case where it is determined that the estimated motor induction voltage is the same as or higher than the predetermined value (N), the step S3003 is followed by the step S3005.

In the step S3004, it is determined that the induction voltage generated in the two-group-three-phase motor 2050 is lower than a voltage that causes a failure in the two-group-three-phase inverter 2030; the all-phase cutoff (6SO) is continued; then, the processing in the flow is ended.

In the case where it is determined in the step S3003 that the estimated motor induction voltage is the same as or higher than the predetermined value (N) and then the step S3003 is followed by the step S3005, it is determined in the step S3005 that the induction voltage generated in the two-group-three-phase motor 2050 becomes a voltage that causes a failure in the two-group-three-phase inverter 2030; then, there is performed three-phase short-circuiting (3PS) of only the first group including the first three-phase inverter 231 and the first armature winding group 2051. As a result, the induction voltage, generated in the two-group-three-phase motor 2050, that current flows into the two-groupthree-phase inverter 2030 by way of the switching devices in the first group inverter is returned to the two-group-three-phase motor 2050.

Next, it is determined in the step S3006 whether or not a predetermined time has elapsed after the foregoing three-phase short-circuiting of the first group was performed.

This determination is performed in order to reduce torque fluctuation, caused when the three-phase short-circuiting is performed, by making the timing at which the three-phase short-circuiting (3PS) of the foregoing first group is performed differ from the timing at which the three-phase short-circuiting (3PS) of the second group including the second three-phase inverter 232 and the second armature winding group 2052 is performed.

In the case where it is determined in the step S3006 that the predetermined time has elapsed after the three-phase short-circuiting (3PS) of the first group was performed (Y), the step S3006 is followed by the step S3007; in the case where it is determined that the predetermined time has not elapsed after the three-phase short-circuiting (3PS) of the first group was performed (N), the step S3006 is followed by the step S3008.

In the step S3007, the three-phase short-circuiting of the second group including the second three-phase inverter 232 and the second armature winding group 2052 is performed. As a result, the induction voltage, generated in the two-group-three-phase motor 2050, that flows into the two-group-three-phase inverter 2030 by way of the switching devices in the second group is returned to the two-group-three-phase motor 2050. Thus, the three-phase short-circuiting (3PS) is applied to each of the first and second groups, so that the smoothing capacitor 2031 in the two-group-three-phase inverter 2030 is prevented from being charged with the induction voltage generated in the two-group-three-phase motor 2050. After that, the processing in the flow is ended.

In contrast, in the case where it is determined in the step S3006 that the predetermined time has not elapsed after the three-phase short-circuiting was applied to the first group (N), the S3006 is followed by the step S3008; in the step S3008, because the torque fluctuation at a time when the three-phase short-circuiting (3PS) was applied to the first group has not stabilized, the all-phase cutoff (6SO) of the second group is continued. After that, the processing in the flow is ended.

In the case where it is determined in the step S3002 that the present output of the two-group-three-phase inverter 2030 is in the three-phase short-circuiting (3PS) state (Y), the step S3002 is followed by the step S3009. In the step S3009, it is determined whether or not the estimated motor induction voltage is lower than the predetermined value.

When the output of the two-group-three-phase inverter 2030 is in the three-phase short-circuiting (3PS) state, the two-group-three-phase motor 2050 generates braking torque and hence unnecessary driving-power loss increases. In the three-phase short-circuiting (3PS) state, an electric current constantly flows in the two-group-three-phase motor 2050 as long as the two-group-three-phase motor 2050 is rotating; therefore, the switching devices in the two-group-three-phase motor 2050 and the two-group-three-phase inverter 2030 generate heat. Furthermore, because in the state where the contactor 1004 (refer to FIG. 1) is disconnected, no electric power is supplied to the two-group-three-phase inverter 2030, it is not made possible that electric power is supplied to the other components. That is why in the step S3009, the determination whether or not the estimated motor induction voltage is lower than the predetermined value is performed.

In the case where in the step S3009, it is determined that the estimated motor induction voltage is lower than the predetermined value (Y), the step S3009 is followed by the step S3010; in the case where it is determined that the estimated motor induction voltage is the same as or higher than the predetermined value (N), the step S3009 is followed by the step S3016.

In the step S3010, it is determined whether or not the equation (1) below is satisfied. The reason why the foregoing determination is performed is that the operation is made in such a way that a sudden rise, in the power-source voltage, that is caused when the state of the first group is switched from the three-phase short-circuiting (3PS) to the all-phase cutoff (6SO) becomes a voltage lower than the allowable voltage.

$$\tfrac{1}{2}C(V_{ov}^2 - V_{dc}^2) > \sqrt{3}LI_{1st}^2 \qquad (1)$$

C: electrostatic capacitance of smoothing capacitor 2031
$V_{ov}$: allowable power-source voltage
$V_{dc}$: present voltage charged in smoothing capacitor
L: inductance of motor 1002
$I_{1st}$: effective value of current flowing is 1st group The left-hand side of the equation (1) denotes energy that can be absorbed by the smoothing capacitor 2031. The right-hand side of the equation (1) denotes energy generated by the first armature winding group 2051 and the second armature winding group 2052 in the two-group-three-phase motor 2050. The balance between the energy that can be absorbed by the smoothing capacitor 2031 and the energy generated by the coils is kept, so that a sudden rise in the power-source voltage, caused when the three-phase snort-circuiting (3PS) state is switched to the all-phase cutoff (6SO) state, can be controlled.

In the case where it is determined in the step S3010 that the equation (1) is satisfied (Y), the step S3010 is followed by the step S3011; in the case where it is determined that the equation (1) is not satisfied (N), the step S3010 is followed by the step S3014.

In the step S3011, it is determined that the sudden rise in the power-source voltage, caused when the three-phase short-circuiting (3PS) state is switched to the all-phase cutoff (6SO) state, is within the allowable voltage, and then the all-phase cutoff (6SO) is applied to the first group including the first three-phase inverter 231 and the first armature winding group 2051. After that, the step S3011 is followed by the step S3012.

In the step S3012, it is determined whether or not the equation (2) below is satisfied. The reason why the foregoing determination is performed is that as is the case with the first group including the first three-phase inverter 231 and the first armature winding group 2051, it is required that the sudden rise in the power-source voltage, caused when the three-phase short-circuiting (3PS) state is switched to the all-phase cutoff (6SO) state, becomes a voltage lower than the allowable voltage.

$$\tfrac{1}{2}C(V_{ov}^2 - V_{dc}^2) > \sqrt{3}LI_{2st}^2 \qquad (2)$$

C: electrostatic capacitance of smoothing capacitor 2031
$V_{ov}$: allowable power-source voltage
$V_{dc}$: present voltage charged in smoothing capacitor
L: inductance of motor 1002 effective value of current flowing in 2nd group The equation (2) denotes the same meaning as the equation (1) does.

In the case where it is determined in the step S3012 that, the equation (2) is satisfied (Y), the step S3012 is followed by the step S3013; in the case where it is determined that the equation (2) is not satisfied (N), the step S3012 is followed by the step S3015.

In the step S3013, it is determined that the sudden rise in the power-source voltage, caused when the three-phase short-circuiting (3PS) state is switched to the all-phase cutoff (6SO) state, is within the allowable voltage, and then the all-phase cutoff (6SO) is applied to the second group. After that, the processing in the flow is ended. The implementation of this operation makes it possible that the sudden rise in the power-source voltage, caused when the three-phase short-circuiting (3PS) state is switched to the all-phase cutoff (6SO) state, is suppressed and hence unnecessary driving-power loss is suppressed, that the two-group-three-phase motor 2050 and the switching devices in the two-group-three-phase inverter 2030 are suppressed from generating heat, and that electric power can be supplied to the other components by use of the induction voltage in the two-group-three-phase motor 2050. Furthermore, it is made possible to suppress the maximum value of the power-source voltage that is caused to suddenly rise when the state of each of the groups is switched from the three-phase short circuiting (3PS) state to the all-phase cutoff (6SO) state; thus, the capacitance of the smoothing capacitor 2031 can be reduced and hence the cost can be decreased.

In contrast, when it is determined in the foregoing step S3010 that the equation (1) is not satisfied (N) and then the step S3010 is followed by the step S3014, it is determined in the step S3014 that the sudden rise in the power-source voltage, caused when the state of the first group is switched from the three-phase short-circuiting (3PS) state to the all-phase cutoff (6SO) state, becomes the same as or higher than the allowable voltage, and then the three-phase short-circuiting (3PS) of the first group is continued. After that, the processing in the flow is ended.

When it is determined in the foregoing step S3012 that the equation (2) is not satisfied (N) and then the step S3012 is followed by the step S3015, it is determined in the step S3015 that the sudden rise in the power-source voltage, caused when the state of the second group is switched from the three-phase port-circuiting (3PS) state to the all-phase cutoff (6SO) state, becomes the same as or higher than the allowable voltage, and then the three-phase short-circuiting (3PS) of the second group is continued. After that, the processing in the flow is ended.

Furthermore, when it is determined in the foregoing step S3009 that the estimated motor induction voltage is higher than the predetermined value (N) and then the step S3009 is followed by the step S3016, it is determined in the step S3016 that the induction voltage generated in the two-group-three-phase motor 2050 is too high to perform the all-phase cutoff (6SO), and then the three-phase short-circuiting (3PS) is continued. After that, the processing in the flow is ended.

Embodiment 2

Figure 4A:
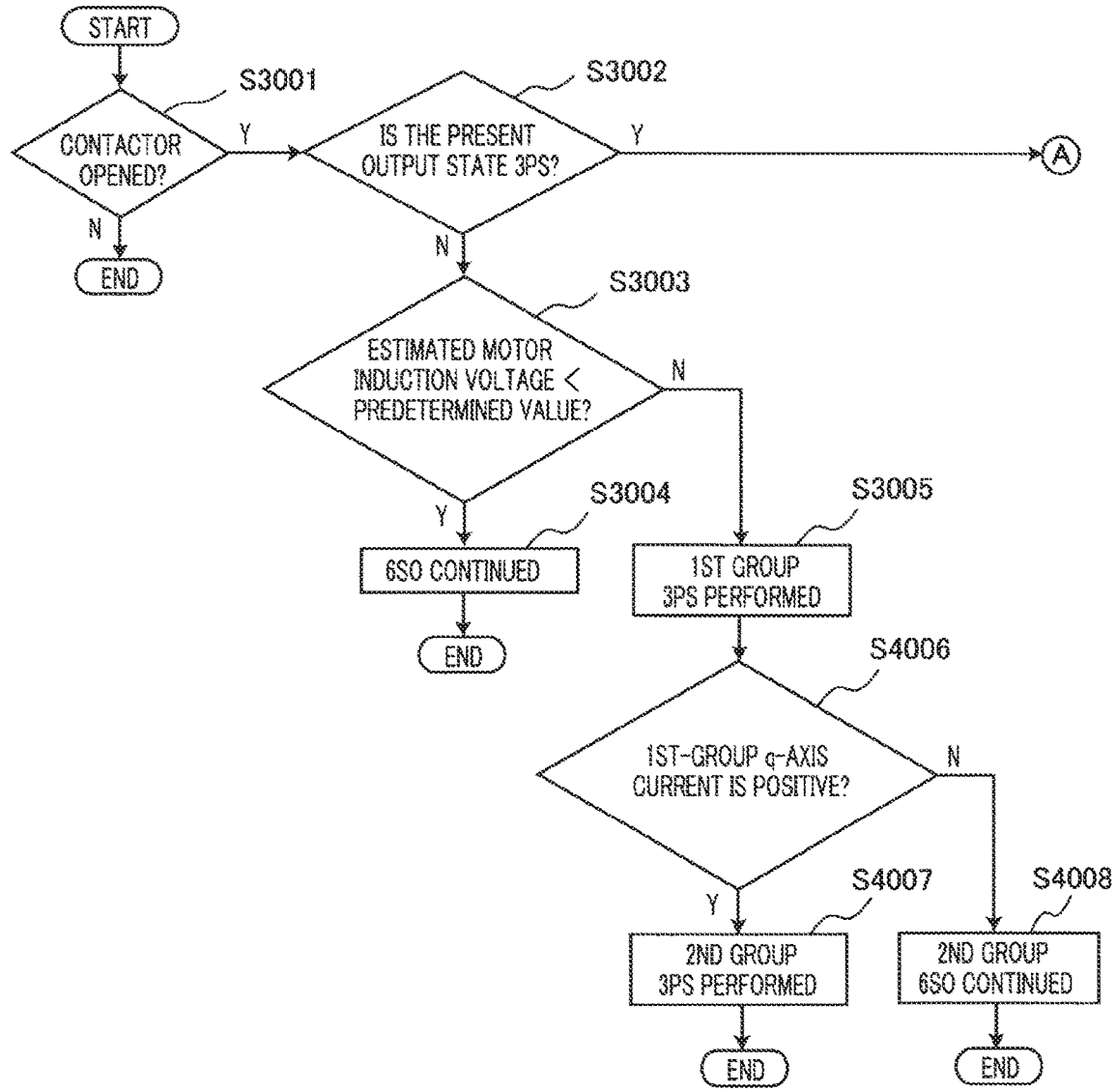
FIG. 4A and FIG. 4B are flowcharts representing the operation of the rotating-electric-machine driving apparatus according to Embodiment 2 of the present invention.
Figure 4B:
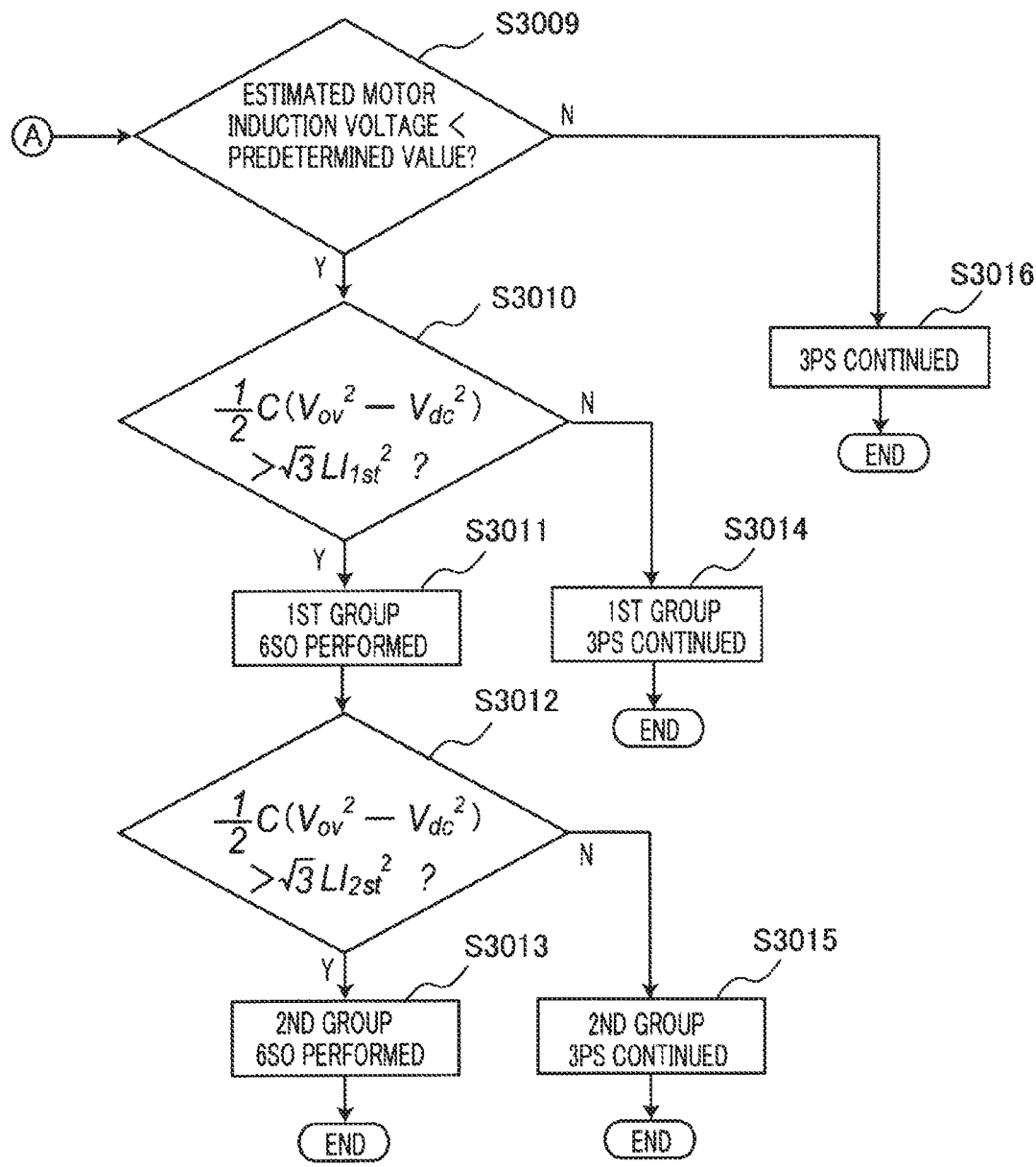

Next, a rotating-electric-machine driving apparatus according to Embodiment 2 of the present invention will be explained. FIG. 4A and FIG. 4B are flowcharts representing the operation of the rotating-electric-machine driving apparatus according to Embodiment 2 of the present invention. The differences between Embodiment 1 and Embodiment 2 are only the respective differences between the steps S3006, S3007, and S3008 in FIG. 3A and the steps S4006, S4007, and S4008 in FIG. 4A; thus, in the explanation below, the differences will mainly be explained. Hereinafter, by use of FIG. 4A and FIG. 4B, the case where the step S4006 is utilized when the all-phase cutoff (6SO) state is switched to the three-phase short-circuiting (3PS) state will be explained in detail.

In the step S4006 in FIG. 4A, it is determined whether or not a first-group q-axis current is of a positive value. In the case where when the three-phase short-ciruiting (3PS) is applied to the first group including the first three-phase inverter 231 and the first armature winding group 2051, the first-group q-axis current changes to be of a positive value, positive torque is generated in the two-group-three-phase motor 2050. When the three-phase short-circuiting (3PS) is applied to the second group at this timing, the second group makes negative torque generated in the two-group-three-phase motor 2050.

As a result, the negative torque generated by the second group can suppress the positive torque generated by the first group. Thus, in the step S4006, it is determined whether or not the first-group q-axis current is of a positive value, and then the following operation is performed based on the result.

In the case where it is determined in the step S4006 that the first-group q-axis current is of a positive value the step S4006 is followed by the step S4007; in the case where it is determined that the first-group q-axis current is not of a positive value (N), the step S4006 is followed by the step S4008.

In the step S4007, it is determined that the torque generated by the first group is positive, and then the three-phase short-circuiting (3PS) of the second group is performed. After that, the processing in the flow is ended. This makes it possible to suppress the fluctuation of the braking torque, of the two-group-three-phase motor 2050, that is caused when the all-phase cutoff (6SO) state is switched to the three-phase short-circuiting (3PS) state; therefore, it is made possible that the vehicle behavior is stabilized and the drivability is raised and that a sudden change in the engine rotation speed is preliminarily prevented from stopping the engine.

In contrast, in the case where it is determined in the step S4006 that the first-group q-axis current is not a positive value (N), the S4006 is followed by the step S4008; in the step S4008, it is determined that the torque generated by the first group is negative, and then the all-phase cutoff (6SO) of the second group is continued. After that, the processing in the flow is ended.

In the step S4006, based on the first-group q-axis current, the determination on the torque at a time when the three-phase short-circuiting (3PS) is applied to the first group is performed; however, the determination utilizing motor estimated torque can demonstrate the same effect. Additionally, it may be allowed that the three-phase short-circuiting 3PS) of the second group is preliminarily performed when a second-group q-axis current is of a value with which the summation value of the positive torque generated by the first group and the negative torque generated by the second group becomes minimum.

Figure 5:
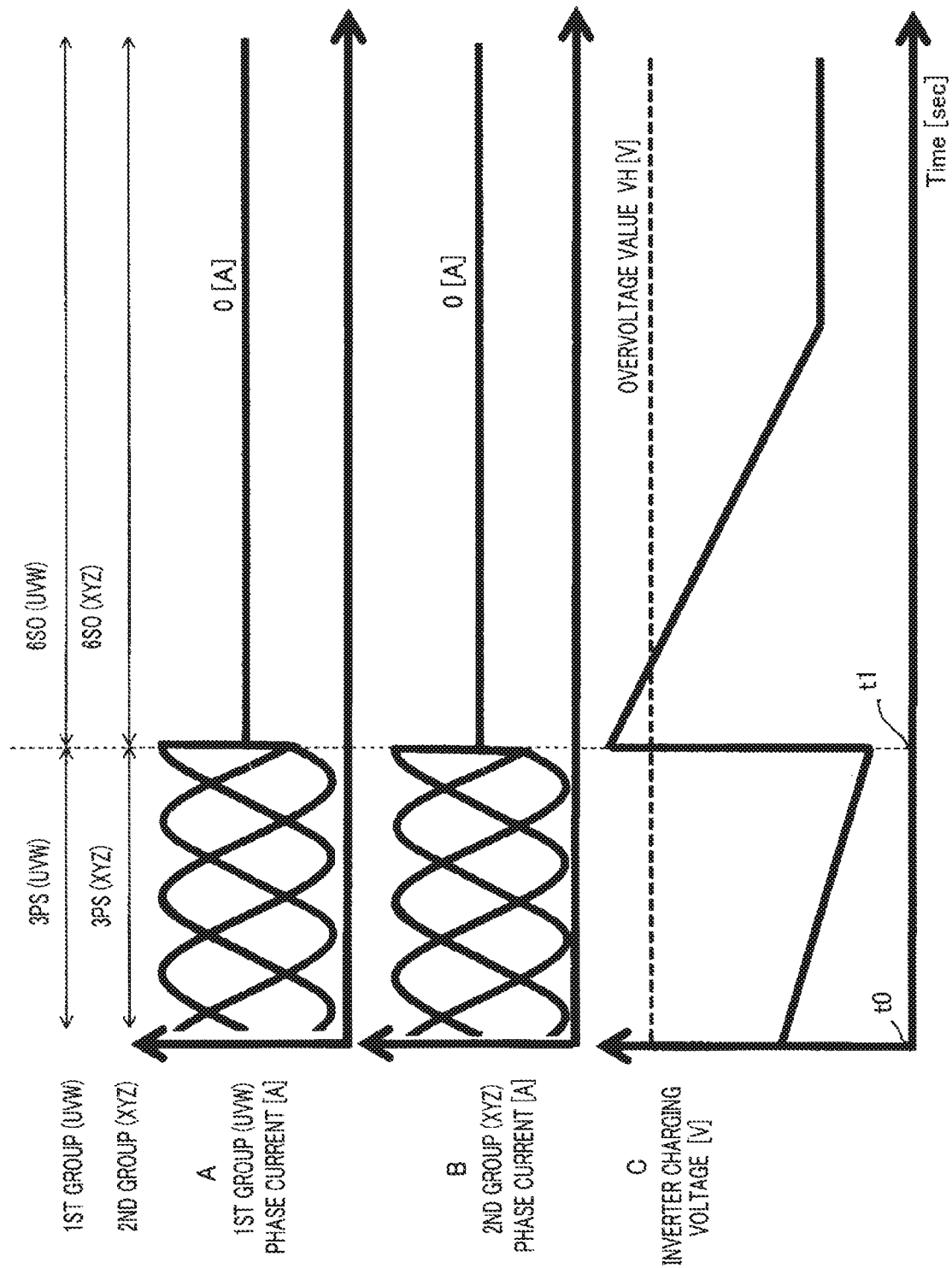
FIG. 5 is a waveform chart representing the respective waveforms of three-phase currents and the charging voltage of an inverter at a time when under the condition that electric-power transfer between the battery and the inverter cannot be performed, all-phase cutoff is applied to the rotating electric machine in the three-phase short-circuiting state.

FIG. 5 is a waveform chart representing the respective waveforms of three-phase currents and the charging voltage of the inverter at a time when under the condition that electric-power transfer between the battery and the inverter cannot be performed, all-phase cutoff is applied to the rotating electric machine in the three-phase short-circuiting state; "A", "B", "C" represent the first-group phase currents

[A], the second-group phase currents [A], and the inverter charging voltage[V], respectively; the abscissa denotes the time Time [sec].

Hereinafter, by use of FIG. 5, there will be explained a sudden rise in the inverter charging voltage at a time when the three-phase short-circuiting (3PS) state is switched to the all-phase cutoff (6SO) state. In FIG. 5, in the period from a time point t0 to a time point t1, both the first and second groups are in the three-phase short-circuiting (3PS) state; the U-phase, V-phase, and W-phase currents of the first group are represented in "A", and the second-group phase currents are represented in "B". In the period from the time point t0 to the time point t1, the inverter charging voltage gradually decreases and then becomes zero, as represented in "C". As described above, in the case where under the condition that electric-power transfer between the battery and the inverter is cut off, the two-group-three-phase motor 2050 performs no regenerative behavior, the voltage charged in the inverter gradually decreases and becomes zero in due course of time.

Thus, when the all-phase cutoff (6SO) is applied to both the first and second groups, the induction voltage in the two-group-three-phase motor 2050 can raise the inverter charging voltage. However, as represented in "A" and "B" of FIG. 5, when the all-phase cutoff (6SO) is simultaneously applied to the first and second groups at the time point t1, the magnetic energy in the two-group-three-phase motor 2050 makes the inverter charging voltage suddenly rise at the time point t1, as represented in "C", and hence the inverter charging voltage exceeds an overvoltage value VH. As a result, the switching devices in the two-group-three-phase inverter 2030 and the peripheral devices may be broken.

Figure 6:
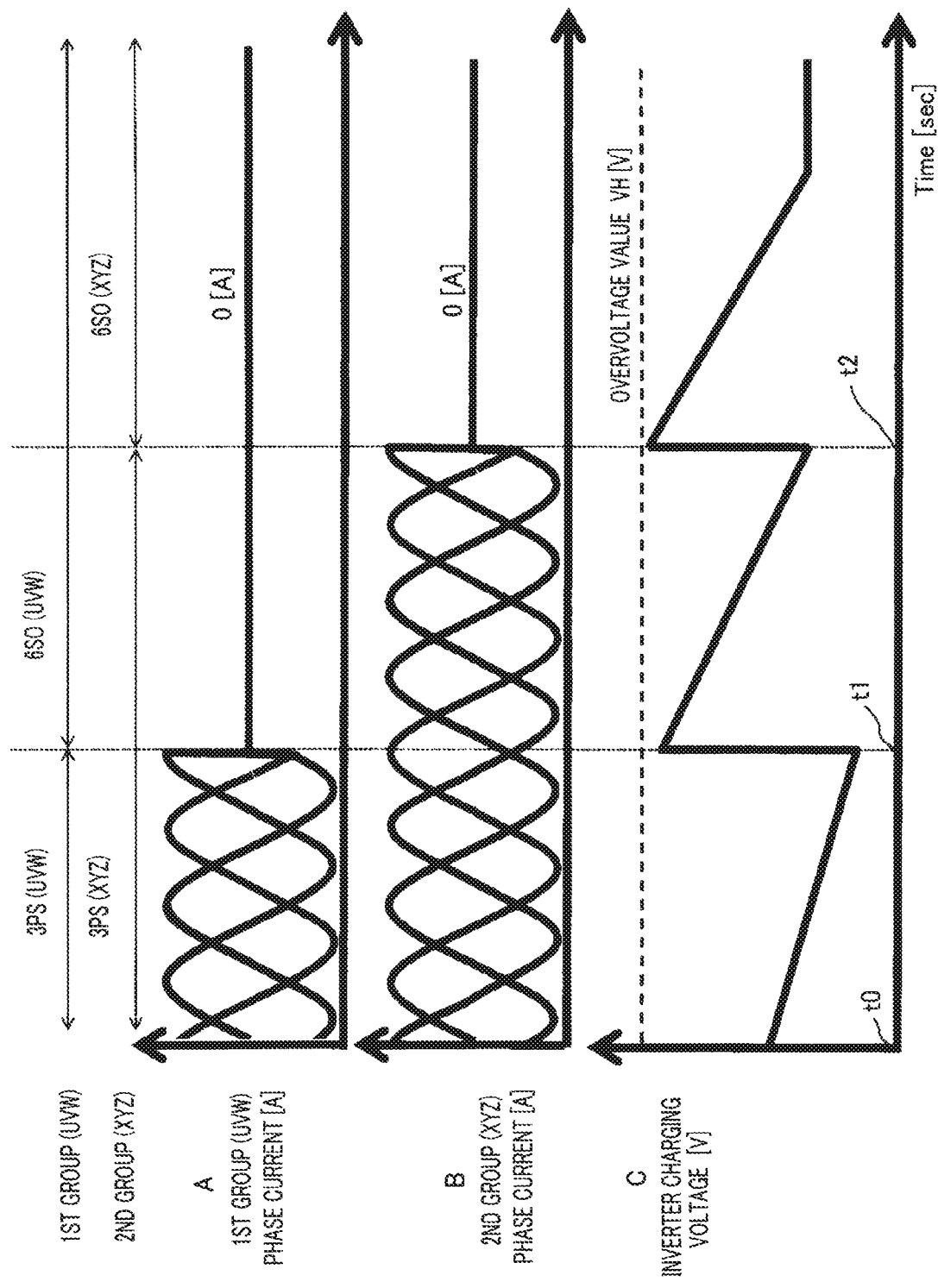
FIG. 6 is a waveform chart representing the respective waveforms of three-phase currents and the charging voltage of the inverter, in the rotating-electric-machine driving apparatus according to any one of Embodiments 1 and 2 of the present invention, at a time when under the condition that electric-power transfer between the battery and the inverter cannot be performed, all-phase cutoff is applied to the rotating electric machine in the three-phase short-circuiting state.

FIG. 6 is a waveform chart representing the respective waveforms of three-phase currents and the charging voltage of the inverter, in the rotating-electric-machine driving apparatus according to any one of Embodiments 1 and 2 of the present invention, at a time when under the condition that electric-power transfer between the battery and the inverter cannot be performed, all-phase cutoff is applied to the rotating electric machine in the three-phase short-circuiting state; "A", "B", "C" represent the first-group phase currents [A], the second-group phase currents [A], and the inverter charging voltage [V], respectively; the abscissa denotes the time Time [sec].

Hereinafter, by use of FIG. 6, there will be explained the fact that when the three-phase short-circuiting (3PS) state is switched to the all-phase cutoff (6SO) state, this transition is performed at respective different timings for the first group and the second group, so that without causing the overvoltage value VH to occur, the transition to the all-phase cutoff (6SO) can be performed.

In FIG. 6, in the period from a time point t0 to a time point t1, both the first and second groups are in the three-phase short-circuiting (3PS) state; the U-phase, V-phase, and W-phase currents of the first group are represented in "A", and the second-group phase currents are represented in "B". In the period from the time point t0 to the time point t1, the inverter charging voltage gradually decreases and then becomes zero in due course of time, as represented in "C".

In this situation, there are calculated the magnetic energy generated when the state of the first group is switched from the three-phase short-circuiting (3PS) state to the all-phase cutoff (6SO) state and the energy that can be absorbed by the smoothing capacitor 2031 in the two-group-three-phase inverter 2030, and then it is determined that, the sudden-rise voltage does not exceed the overvoltage (the step S3010 in each of FIGS. 3 and 4); then, the all-phase cutoff (6SO) is applied only to the first group at the time point t1 (the step S3011 in each of FIGS. 3 and 4). As a result, the first-group phase currents become zero after and including the time point t1, as represented in "A". In the period from the time point t1 to a time point t2, the second group is left in the three-phase short-circuiting (3PS) state; however because at the time point t1, the first group is in the all-phase short-circuiting (6SO) state and hence the first-group phase currents become zero, the inverter charging voltage becomes the same as or lower than the overvoltage value VH, as represented in "C".

Next, it is determined that the sudden-rise voltage in the second group also does not exceed the overvoltage (the step S3012 in each of FIGS. 3 and 4), and then the all-phase cutoff (6SO) is applied to the second group (the step S3013 in each of FIGS. 3 and 4). As a result, the first-group phase currents become zero after and including the time point t2, as represented in "A". In the period from the time point t1 to the time point t2, the first group has already been in the three-phase short-circuiting (3PS) state and the phase currents are zero; then, at the time point t2, the all-phase short-circuiting (6SO) is applied to the second group and hence the second-group phase currents also become zero; therefore, the inverter charging voltage becomes the same as or lower than the overvoltage value VH, as represented in "C".

As described above, when the three-phase short-circuiting (3PS) state is switched to the all-phase cutoff (6SO) state, this transition is performed at respective different timings for the first group and the second group, i.e., this transition is performed stepwise between the first and second groups, so that the value of the sudden-rise voltage, caused when the state of the two-group-three-phase motor 2050 is switched from the three-phase short-circuiting (3PS) state to the all-phase cutoff (6SO) state, can be suppressed to be the same as or lower than the overvoltage value VH.

Figure 7:
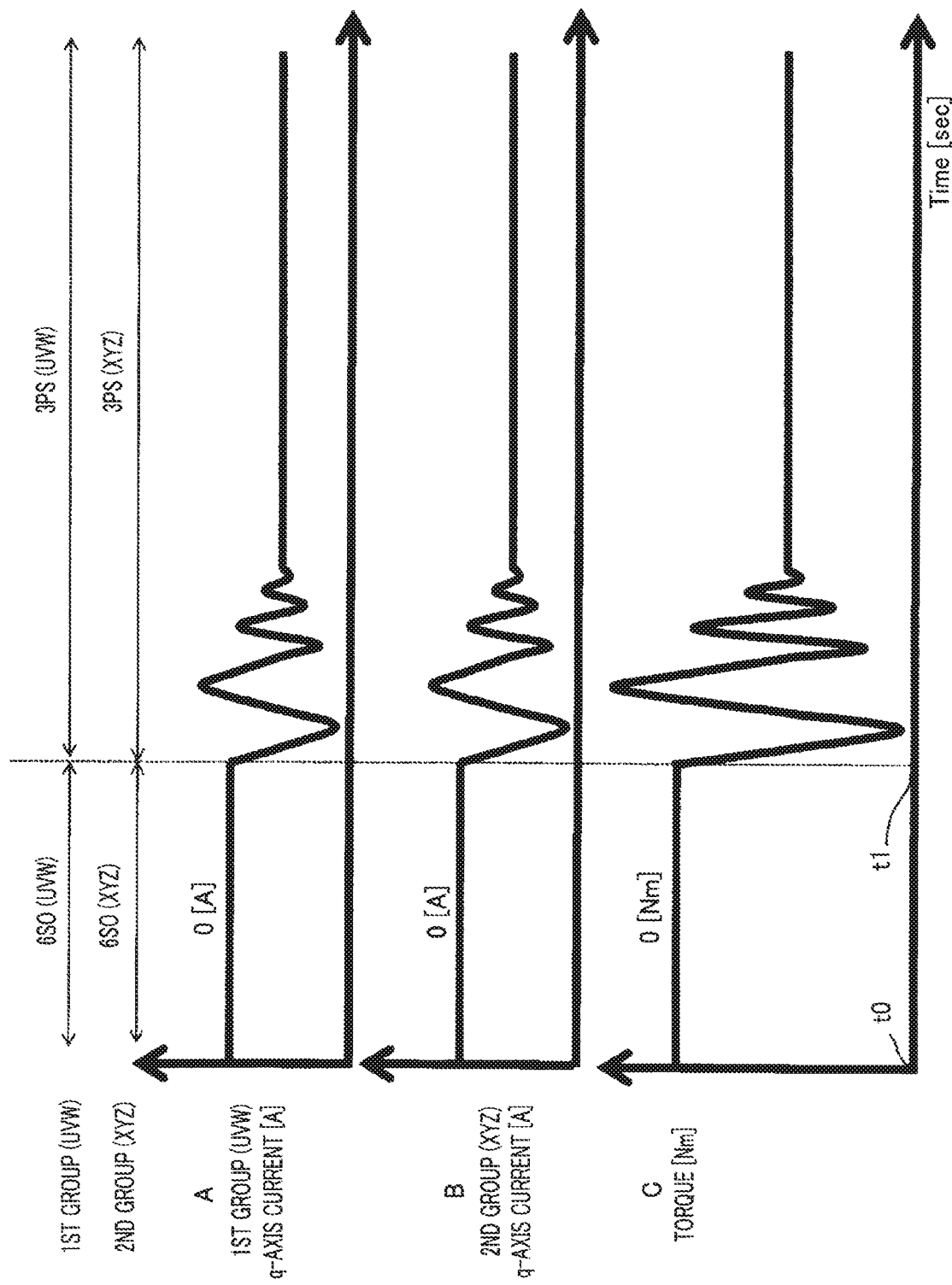
FIG. 7 is a waveform chart representing the respective waveforms of three-phase currents and the torque of the rotating electric machine at a time when under the condition that electric-power transfer between the battery and the inverter cannot be performed, three-phase short-circuiting is applied to the rotating electric machine in the all-phase cutoff state.

Next, there will be explained a fluctuation of braking torque that is generated in the two-group-three-phase motor 2050 when the all-phase cutoff (6SO) state is switched to the three-phase short-circuiting (3PS) state. FIG. 7 is a waveform chart representing the respective waveforms of three-phase currents and the torque of the rotating electric machine at a time when under the condition that electric-power transfer between the battery and the inverter cannot be performed, three-phase shore-circuiting is applied to the rotating electric machine in the all-phase cutoff state; "A", "B", "C" represent the first-group q-axis current [A], the second-group q-axis current [A], and the torque generated by the two-group-three-phase motor 2050 [Nm], respectively; the abscissa denotes the time Time [sec].

FIG. 7, in the period from the time point t0 to the time point t1, because both the first and second groups are in the all-phase cutoff (6SO) state, both the first-group q-axis current and the second-group q-axis current are zero, as represented in "A" and "B", respectively, and the torque generated by the two-group-three-phase motor 2050 is zero, as represented in "C".

Next, when at the time point t1, both the respective states of the first and second groups are simultaneously switched from the all-phase cutoff (6SO) state to the three-phase short-circuiting (3PS) state, both the first-group q-axis current represented in "A" and the second-group q-axis current represented in "B" transiently fluctuate in one and the same direction. As a result, the braking torque generated based on the first-group q-axis current and the braking torque generated based on the second-group q-axis current are added and hence the torque generated by the two-group-three-phase motor 2050 transiently and largely fluctuates, as represented in "C". Due to this fluctuation of the braking torque, the engine rotation speed fluctuates and hence an engine stall or vehicle vibration may be caused.

Next, the respective cases in Embodiments 1 and 2 of the present invention will be explained. FIG. 8 is a waveform chart representing the respective waveforms of three-phase currents and the torque of the rotating electric machine, in the rotating-electric-machine driving apparatus according to any one of Embodiments 1 and 2 of the present invention, at a time when under the condition that electric-power transfer between the battery and the inverter cannot be performed, three-phase short-circuiting is applied to the rotating electric machine in the all-phase cutoff state; "A", "B", "C" represent the first-group q-axis current [A], the second-group q-axis current [A], and the torque generated by the two-group-three-phase motor 2050 [Nm], respectively; the abscissa denotes the time Time [sec].

Hereinafter, by use of FIG. 8, there will be explained the fact that when the three-phase short-circuiting (3PS) state is switched to the all-phase cutoff (6SO) state, this transition is performed at respective different timings for the first group and the second group, so that the fluctuation in the braking torque of the two-group-three-phase motor 2050 can be suppressed.

In FIG. 8, in the period from the time point t0 to the time point t1, because both the first and second groups are in the all-phase cutoff (6SO) state, both the first-group q-axis current and the second-group q-axis current are zero, as represented in "A" and "B", respectively, and the torque generated by the two-group-three-phase motor 2050 is zero, as represented in "C".

Next, at first, when at the time point t1, the state of the first group is switched from the all-phase cutoff (6SO) state to the three-phase short-circuiting(3PS) state, as represented in "A", the first-group q-axis current fluctuates at the time point t1, as represented in "A", and the braking torque of the two-group-three-phase motor 2050 transiently fluctuates based on the fluctuation of the first-group q-axis current.

Next, at a time point t2 at which after the time point t1, the braking torque, of the two-group-three-phase motor 2050, that is based on the first-group d-axis current changes from a negative value to a positive value, the state of the second group is switched from the all-phase cutoff (6SO) state to the three-phase short-circuiting (3PS) state, as represented in "B". Accordingly, as represented in "C", the positive-direction braking torque that is generated by the two-group-three-phase motor 2050, based on the first-group q-axis current, and the negative-direction braking torque that is generated by the two-group-three-phase motor 2050, based on the second-group q-axis current, cancel out each other; as a result, the total braking torque, generated by the two-group-three-phase motor 2050 when the all-phase cutoff (6SO) state is switched to the three-phase short-circuiting (3PS) state, is suppressed from fluctuating.

With regard to the timing at which the three-phase short-circuiting (3PS) is applied to the second group, it may be allowed that in order to make the peak of the positive-direction braking torque based on the first-group q-axis current coincide with the peak of the negative-direction braking torque based on the second-group q-axis current, the three-phase short-circuiting (3PS) is applied to the second group a predetermined time after the three-phase short-circuiting (3PS) of the first group has been performed. As a result, the fluctuation of the braking torque generated by the two-group-three-phase motor 2050 can further effectively be suppressed.

The present invention is not limited to the multigroup-multiphase rotating-electric-machine driving apparatus according to any one of foregoing Embodiments 1 and 2; in the scope within the spirits of the present invention, the configurations of Embodiments 1 and 2 can appropriately be combined with each other, can partially be modified, or can partially be omitted.

INDUSTRIAL APPLICABILITY

The present invention can be applied not only to the field of a rotating electric machine having multi-group multi-phase armature windings but also to the fields of a hybrid vehicle and an electric automobile in each of which the rotating electric machine is utilized.

DESCRIPTION OF REFERENCE NUMERALS

1001: engine
1002: motor
1003: inverter
1004: contactor
1005: battery
1006: transmission
1007: wheel
3UH: U-phase upper arm switching device
3UL: U-phase lower arm switching device
3VH: V-phase upper arm switching device
3VL: V-phase lower arm switching device
3WH: W-phase upper arm switching device
3WL: W-phase lower arm switching device
3XH: X-phase upper arm switching device
3XL: X-phase lower arm switching device
3YB: Y-phase upper arm switching device
3YL: Y-phase lower arm switching device
3ZB: Z-phase upper arm switching device
3ZL: Z-phase lower arm switching device
2001: micro control unit
2002: battery
2004: current sensor
2006: rotation angle sensor
2030: two-group-three-phase inverter
231: first three-phase inverter
232: second three-phase inverter
2031: smoothing capacitor
2032: voltage sensor
2033: U-phase current sensor
2034: V-phase current sensor
2035: W-phase current sensor
2036: X-phase current sensor
2037: Y-phase current sensor
2033: Z-phase current sensor
2050: two-group-three-phase motor
2051: first armature winding group
2052: second armature winding group
2071: first coil temperature sensor
2072: second coil temperature sensor

The invention claimed is:

1. A multigroup-multiphase rotating-electric-machine driving apparatus that drives a multigroup-multiphase rotating electric machine having independent multigroup-multiphase armature windings and magnetic-field poles formed of permanent magnets, the multigroup-multiphase rotating-electric-machine driving apparatus comprising:
a multigroup-multiphase electric-power conversion apparatus provided with two or more groups of electric-power conversion apparatuses that are provided corresponding to multigroup-multiphase armature windings and each of which performs electric-power conversion between the multiphase armature winding of the corresponding group and a DC power source;

a smoothing capacitor connected with the DC side of the multigroup-multiphase electric-power conversion apparatus; and a control apparatus configured in such a way as to be able to separately control the two or more groups of electric-power conversion apparatuses, wherein each of the two or more groups of electric-power conversion apparatuses includes two or more switching devices to be controlled by the control apparatus, and wherein when a connection between the DC power source and the multigroup-multiphase electric-power conversion apparatus is cut off, the control apparatus controls the two or more switching devices so that respective states of the two or more groups of electric-power conversion apparatuses are each switched stepwise from an all-phase short-circuiting state to an all-phase cutoff state at different timings.

2. The multigroup-multiphase rotating-electric-machine driving apparatus according to claim 1, wherein when an estimation value of an induction voltage in the multigroup-multiphase rotating electric machine is the same as or smaller than a predetermined voltage value and one of the two or more groups of electric-power conversion apparatuses is in an operational state that satisfies the equation (1) below, the control apparatus controls the switching devices so that the state of the one of the two or more groups of electric-power conversion apparatuses is switched from the all-phase short-circuiting to the all-phase cutoff state:

$$\tfrac{1}{2}C(V_{ov}^2 - V_{dc}^2) > \sqrt{3} L I_{1st}^2 \tag{1}$$

C: electrostatic capacitance of smoothing capacitor
$V_{ov}$: allowable power-source voltage
$V_{dc}$: present voltage charged in smoothing capacitor
L: inductance of motor
$I_{1st}$: effective value of current flowing in the one of the two or more groups of electric-power conversion apparatuses.

3. The multigroup-multiphase rotating-electric-machine driving apparatus according to claim 2, wherein when the one of the two or more groups of electric-power conversion apparatuses is in the all-phase short-circuiting state and the other one of the two or more groups of electric-power conversion apparatuses is in an operational state that satisfies the equation (2) below, the control apparatus controls the switching devices so that the state of the other one of the two or more groups of electric-power conversion apparatuses is switched from the phase short-circuiting state to the all-phase cutoff state:

$$\tfrac{1}{2}C(v_{ov}^2 - V_{dc}^2) > \sqrt{3} L\, I_{2st}^2 \tag{2}$$

C: electrostatic capacitance of smoothing capacitor
$V_{ov}$: allowable power-source voltage
$V_{dc}$: present voltage charged in smoothing capacitor
L: inductance of motor
$I_{2st}$: effective value of current flowing in the other one of the two or more groups of electric-power conversion apparatuses.

4. The multigroup-multiphase rotating-electric-machine driving apparatus according to claim 1, wherein when the two or more groups of electric-power conversion apparatuses are in the all-phase cutoff state, the control apparatus controls the switching devices so that the respective states of the two or more groups of electric-power conversion apparatuses are each switched stepwise to the all-phase short-circuiting state at different timings.

5. The multigroup-multiphase rotating-electric-machine driving apparatus according to claim 2, wherein when the two or more groups of electric-power conversion apparatuses are in the all-phase cutoff state, the control apparatus controls the switching devices so that the respective states of the two or more groups of electric-power conversion apparatuses are each switched stepwise to the all-phase short-circuiting state at different timings.

6. The multigroup-multiphase rotating-electric-machine driving apparatus according to claim 3, wherein when the two or more groups of electric-power conversion apparatuses are in the all-phase cutoff state, the control apparatus controls the switching devices so that the respective states of the two or more groups of electric-power conversion apparatuses are each switched stepwise to the all-phase short-circuiting state at different timings.

7. The multigroup-multiphase rotating-electric-machine driving apparatus according to claim 4, wherein when the all-phase cutoff state is switched to a three-phase short-circuiting state, the control apparatus controls the switching devices so that at a timing when a q-axis current flowing in one of the two or more groups of electric-power conversion apparatuses becomes positive, the state of the other one of the two or more groups of electric-power conversion apparatuses is switched from the all-phase cutoff state to the all-phase short-circuiting state.

8. The multigroup-multiphase rotating-electric-machine driving apparatus according to claim 5, wherein when the all-phase cutoff state is switched to an all-phase short-circuiting state, the control apparatus controls the switching devices so that at a timing when a q-axis current flowing in one of the two or more groups of electric-power conversion apparatuses becomes positive, the state of the other one of the two or more groups of electric-power conversion apparatuses is switched from the all-phase cutoff state to the all-phase short-circuiting state.

9. The multigroup-multiphase rotating-electric-machine driving apparatus according to claim 6, wherein when the all-phase cutoff state is switched to an all-phase short-circuiting state, the control apparatus controls the switching devices so that at a timing when a q-axis current flowing in one of the two or more groups of electric-power conversion apparatuses becomes positive, the state of the other one of the two or more groups of electric-power conversion apparatuses is switched from the all-phase cutoff state to the all-phase short-circuiting state.

10. The multigroup-multiphase rotating-electric-machine driving apparatus according to claim 4, wherein when the all-phase cutoff state is switched to the all-phase short-circuiting state, the control apparatus switches the state of one of the two or more groups of electric-power conversion apparatuses from the all-phase cutoff state to the all-phase short-circuiting state and then switches the state of the other one of the two or more groups of electric-power conversion apparatuses from the all-phase cutoff state to the all-phase short-circuiting state.

11. The multigroup-multiphase rotating-electric-machine driving apparatus according to claim 5, wherein when the all-phase cutoff state is switched to the all-phase short-circuiting state, the control apparatus switches the state of one of the two or more groups of electric-power conversion apparatuses from the all-phase cutoff state to the all-phase short-circuiting state and then switches the state of the other one of the two or more groups of electric-power conversion apparatuses from the all-phase cutoff state to the all-phase short-circuiting state.

12. The multigroup-multiphase rotating-electric-machine driving apparatus according to claim 6, wherein when the all-phase cutoff state is switched to the all-phase short-circuiting state, the control apparatus switches the state of one of the two or more groups of electric-power conversion apparatuses from the all-phase cutoff state to the all-phase short-circuiting state and then switches the state of the other one of the two or more groups of electric-power conversion apparatuses from the all-phase cutoff state to the all-phase short-circuiting state.

\* \* \* \* \*